United States Patent [19]

Lipschitz

[11] Patent Number: 4,972,986
[45] Date of Patent: Nov. 27, 1990

[54] CIRCUMFERENTIAL INTER-SEAL FOR SEALING BETWEEN RELATIVELY ROTATABLE CONCENTRIC SHAFTS

[75] Inventor: Abraham Lipschitz, Warwick, R.I.
[73] Assignee: EG&G Sealol, Inc., Providence, R.I.
[21] Appl. No.: 265,833
[22] Filed: Nov. 1, 1988
[51] Int. Cl.⁵ .................. F16J 15/40; F16J 15/34; F16J 9/00
[52] U.S. Cl. .................. 277/3; 277/27; 277/96.1; 277/133; 277/173
[58] Field of Search .................. 277/173, 96.1, 133, 277/27, 3, 74, 75, 83

[56] References Cited

U.S. PATENT DOCUMENTS 3,315,968  4/1967  Hanlon .................. 277/27

*Primary Examiner*—Allan N. Shoap
*Assistant Examiner*—Scott Cummings
*Attorney, Agent, or Firm*—Finnegan, Henderson, Farabow, Garrett & Dunner

[57] ABSTRACT

A seal assembly between a rotatable hollow outer shaft and a rotatable inner shaft for sealing a high pressure fluid reservoir from a low pressure fluid reservoir. Axially spaced radially extending first and second runners are attached to the inner shaft. An annular seal ring surrounds and is radially spaced from the inner shaft and disposed between the runners. Fluid flow from the high pressure reservoir to the low pressure reservoir in a path defined by spaces formed between the seal ring and the shafts and runners, and axially through passages in the seal ring. The hydrostatic forces imposed on the seal ring tend to maintain it in its proper position. Radially extending grooves are machined in the opposed surfaces of the runners generating a hydrodynamic lift force between the seal ring and runners proportionate to relative rotation between the shafts, for axially sliding the seal ring relative to the outer shaft in response to relative axial movement between the shafts and for maintaining the flow of fluid and preventing rubbing contact between the seal ring and the runners.

17 Claims, 4 Drawing Sheets

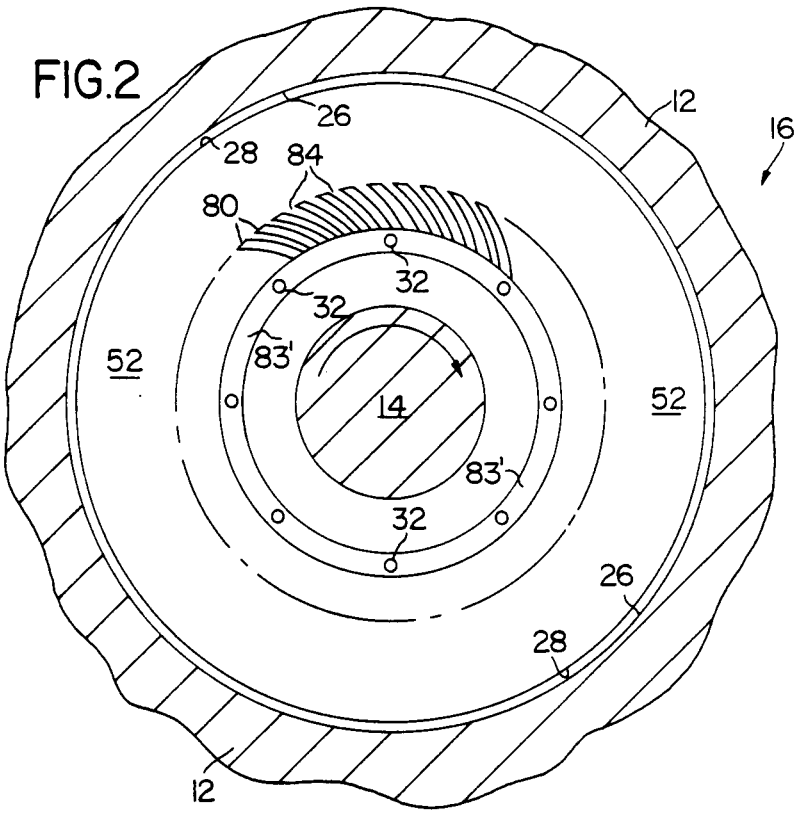
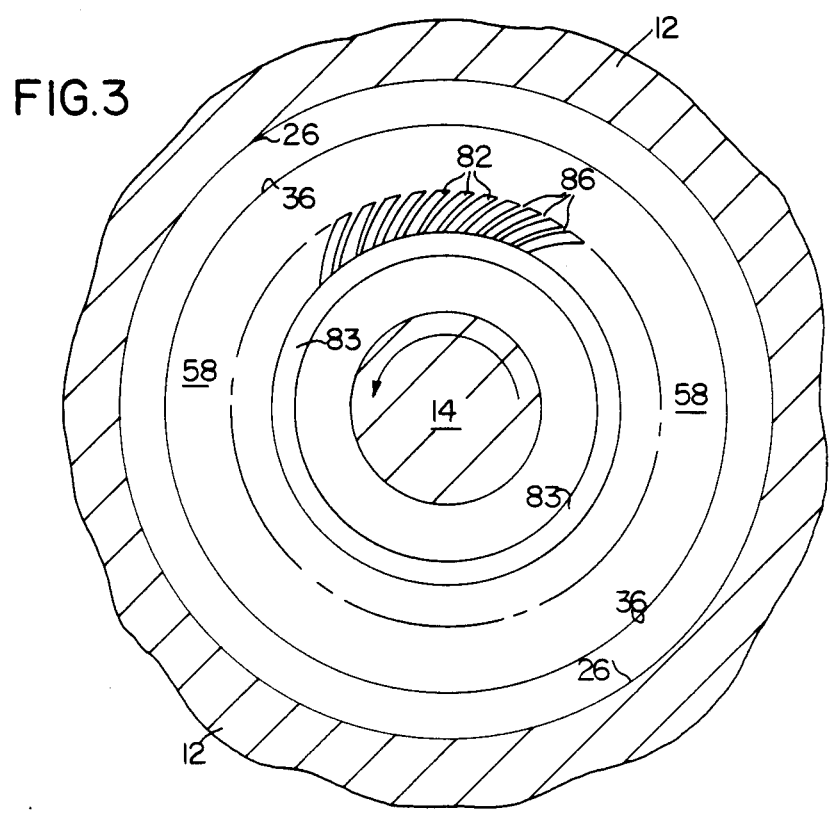

CIRCUMFERENTIAL INTER-SEAL FOR SEALING BETWEEN RELATIVELY ROTATABLE CONCENTRIC SHAFTS

FIELD OF THE INVENTION

The present invention relates to the field of fluid seals, specifically, inter-seals or seals designed to seal between concentric inner and outer shafts.

DESCRIPTION OF RELATED ART

Sealing between concentric inner and outer shafts rotating at high and differing speeds presents special considerations. For example, in a multi-shaft aircraft turbine engine wherein the shaft carrying the low pressure compressor and the low pressure turbine is coaxial with and inside the tubular or hollow shaft carrying the high pressure compressor and the high pressure turbine, the shafts may be co-rotating or counter-rotating with speeds of 10,000 to 20,000 rpm being common. Sealing the annulus between the relative, rotating shafts has typically involved use of ring-type carbon seals with circumferential gaps, so that dilation of the ring would occur during rotation of the outer shaft due to the associated high magnitude centrifugal force, causing the ring to seat tightly against the bore of the outer shaft.

Seals for concentric shafts often have a high pressure area or reservoir on one axial side of the seal and a low pressure area or reservoir on the other axial side. The seals are used primarily to prevent or minimize flow between the high and low pressure reservoirs. Thermal deflection, mechanical loading and pressure differential across such a seal often causes the various elements of the seal to change shape or rub against other seal elements. As a result, the seal s durability and efficiency is negatively affected.

Another problem associated with sealing between such concentric machine shafts is that relative axial motion often occurs between the inner and outer shafts. This motion can be caused by thermal expansion, the startup and shutdown of the machine or the pressure transients across the machine. This axial motion frequently results in increased friction and excessive wear due to rubbing contact between the seal ring and neighboring surfaces. Because of the high centrifugal forces urging the outer arcuate surface of typical seal rings tightly against the bore of the rotating outer shaft, typical seal rings tend to follow the axial translation of the outer shaft. The seal rings through this movement thereby approach other adjacent radially extending structural elements such as the seal housing. Excessive seal ring rubbing reduces seal life.

Attempts have been made in the past to overcome some of the problems associated with seals for concentric shafts, but these attempts have not in the inventor's opinion been fully acceptable. For example, U.S. Pat. Nos. 3,675,935, 4,082,296, and 4,211,424 all disclose complex seals which utilize groove patterns or recesses to create hydrodynamic forces to assist in the operation of the seal. In addition, a self-acting, spiral-groove ring seal for counter-rotating shafts is disclosed in NASA Technical Paper 2142 (1983), "Design Analysis of a Self-Activating Spiral-Groove Ring Seal for Counter-Rotating Shafts", authored by Eliseo DiRusso. Many of these proposed seals are complex in structure and operation and do not promote the best positioning of the seal elements at all phases and speeds of operation.

SUMMARY OF THE INVENTION

The present invention overcomes the problems and disadvantages of the prior art by providing a seal for concentric shafts which is simpler in design and produces hydrostatic and hydrodynamic forces to keep the respective seal elements properly aligned and positioned at various pressures and speeds.

An object of the present invention is to economically and efficiently provide a seal for concentric shafts which minimizes seal wear and damage at all times when the inner and outer concentric shafts of an inter-seal are counter- or co-rotating at various speeds.

Another object is to minimize seal wear and damage at times when there is no or an insignificant amount of relative rotation between the inner and outer shafts of an inter-seal.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

To achieve these objects, and in accordance with the invention as embodied and broadly described herein, a seal assembly utilized between a rotatable hollow outer shaft and a rotatable inner shaft within the outer shaft for sealing a high pressure fluid reservoir from a low pressure fluid reservoir is provided, comprising: axially spaced radially extending first and second runners attached to the inner shaft and radially spaced from the outer shaft, the runners having opposed, radially extending side surfaces; an annular seal ring surrounding and radially spaced from the inner shaft, a portion of the seal ring extending radially to contact the outer shaft, the seal ring being disposed between the runners and having side surfaces that are spaced from the opposed, side surfaces of the runners; hydrostatic means, including a seal ring flow passage means for admitting the fluid to flow axially through the seal ring, for utilizing the pressure differential between the high pressure fluid reservoir and the low pressure fluid reservoir to create hydrostatic forces on the seal ring that tend to maintain the sides of the seal ring substantially uniformly spaced from the respective radially extending side surfaces of the runners; and hydrodynamic means, including means formed in the radially extending side surfaces of the runners, for generating a hydrodynamic lifting force proportionate to relative rotation between the inner and outer shafts to axially slide the seal ring relative to the outer shaft in response to relative axial movement between the inner and outer shafts and thereby prevent the seal ring from contacting the runners.

The accompanying drawings which are incorporated in and constitute a part of the specification, illustrate a preferred embodiment of the invention and, together with a summary of the invention given above and the Detailed Description of the Preferred Embodiment given below, serve to explain the principles of the invention.

BRIEF DESCRIPTION OF THE DRAWINGS

FIG. 2 is a cross-sectional view, taken along line II—II of FIG. 1, and showing the inner surface of the first runner of the present invention.

FIG. 3 is a cross-sectional view taken along line III—III of FIG. 1, showing the inner surface of the second runner of the present invention.

DETAILED DESCRIPTION OF THE PREFERRED EMBODIMENT

Figure 1:
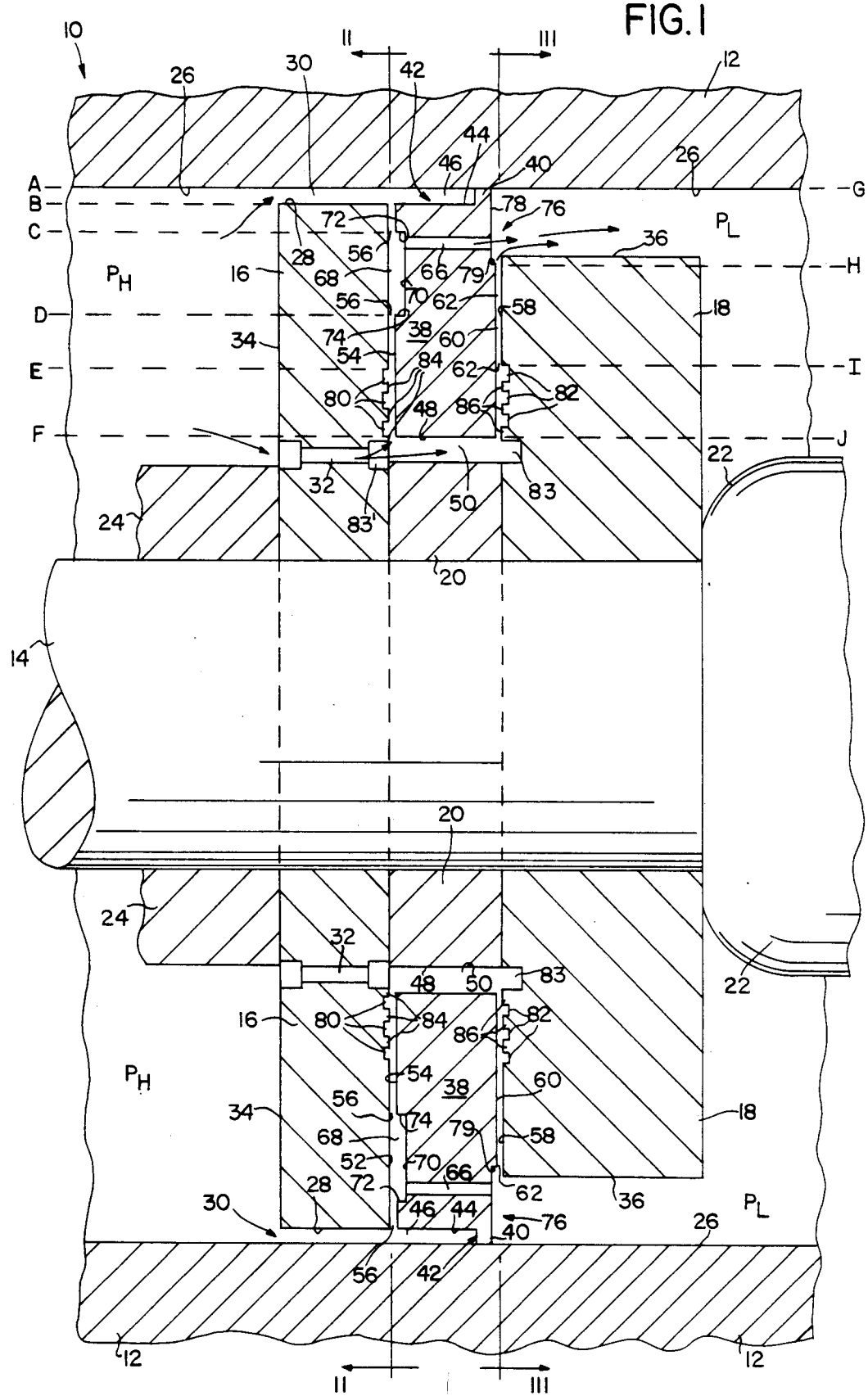
FIG. 1 is a vertical section through a seal assembly positioned between two concentric shafts and incorporating the teachings of the present invention.

Reference will now be made in detail to the present preferred embodiment of the invention, an example of which is illustrated in the accompanying drawings wherein like reference numerals refer to like parts.

A preferred embodiment of the seal assembly is shown in FIG. 1 and is represented generally by the numeral 10. As embodied herein, seal assembly 10 is located between rotatable hollow outer shaft 12 and rotatable inner or central shaft 14. Such concentric shafts are found in multi-shaft aircraft turbine engines, and the seal of the present invention has been particularly designed for use with such engines to prevent or minimize flow between a high pressure fluid reservoir containing, for example, a gas, and a low pressure fluid reservoir containing, for example, a liquid such as oil.

As will be apparent from the following description, the seal of the present invention can be used in a wide variety of applications in which a central shaft rotates within a hollow shaft or a cylindrical housing as shown in FIG. 1 and wherein the seal assembly seals a high pressure fluid reservoir from a low pressure reservoir.

Figure 6:
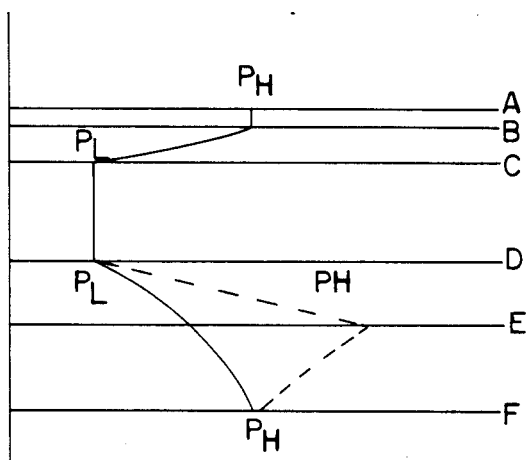
FIG. 6 is a graph showing in schematic form the distribution of fluid pressure forces on the left surface of the seal ring of the present invention.
Figure 7:
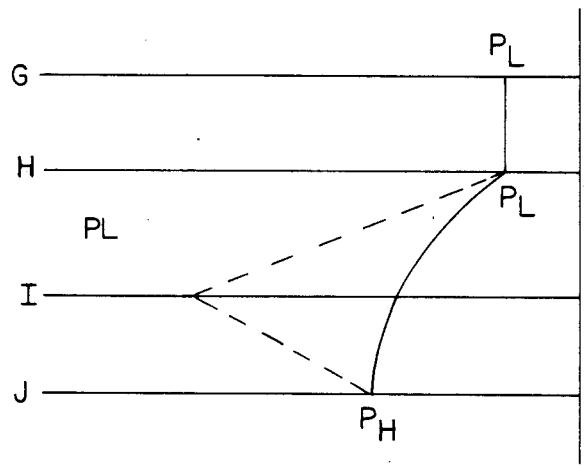
FIG. 7 is a graph showing in schematic form the distribution of fluid pressure forces on the right surface of the seal ring of the present invention.

The seal assembly 10 includes a first runner 16 disposed adjacent a high pressure fluid reservoir $P_H$ and a second runner 18 disposed adjacent low pressure fluid reservoir $P_L$. Hereafter, $P_H$ and $P_L$ will be used to refer synonomously to the high and low pressure fluid reservoirs (FIG. 1), respectively, and to the pressure of the fluid contained in the reservoirs (FIGS. 6 and 7). These runners are attached to shaft 14 through well known means, such as friction fits or mechanical means such as set screws (not shown). Runners 16 and 18 are spaced from each other by annular spacer 20 which is also attached to the inner shaft 12. The runners 16 and 18 and the spacer 20 are further held in position by land 22 formed on the central shaft and by annular stop 24 which is fixed to central shaft 14. The runners, spacer, land and stop rotate as a unit with central shaft 14 and are securely fixed to the shaft to prevent any relative movement between the shaft 14 and these elements.

Each of runners 16 and 18 extends radially outward from the shaft 14 toward the interior surface 26 of the outer, hollow shaft 12, but both are spaced away from the outer shaft 12. As a result, the runners 16, 18 do not rotate with or touch the outer shaft 12.

First runner 16 has a radially outer surface 28 which ends proximate to, but is spaced from, the interior surface 26 of the hollow shaft 12, as seen in FIGS. 1 and 2, to form an annular clearance or space 30 between the runner 16 and the outer shaft 12. Runner 16 also includes a plurality of circumferential, spaced axial passages or ports 32 which extend axially across the width of the runner. Annular space 30 and passages 32 provide a fluid passageway for fluid from high pressure reservoir $P_H$ to pass around runner 16 and enter the interior of seal assembly 10, as explained further below. Passages 32 are preferably positioned proximate the radially outer edges of the stop 24 and spacer 20.

Second runner 18 ends with radially outer surface 36. As shown in FIG. 1, surface 36 is spaced from the interior surface 26 of outer shaft 12 by a distance greater than the distance between the shaft and the radially outer surface 28 of first runner 16. Alternatively, this distance could be equal to or less than the distance between the shaft 12 and surface 28 of first runner 16. Fluid from low pressure reservoir $P_L$ occupies the space between runner 18 and shaft 12.

The spacings between the runners 16, 18 and shaft 12 will in large part be determined based upon mechanical tolerance considerations, such as any out-of-roundness which could be anticipated between shafts 12 and 14 but is normally difficult to accurately measure. Other such considerations include the relative sizes of the other elements of the seal assembly 10, as detailed more fully below.

Figure 4:
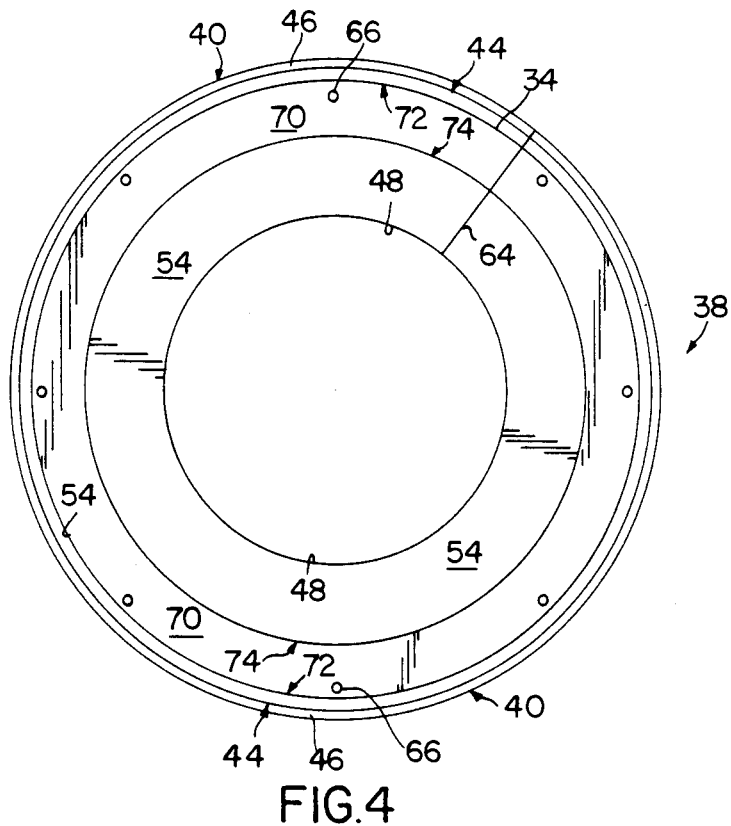
FIG. 4 is a side view showing the left surface of the seal ring of the present invention.
Figure 5:
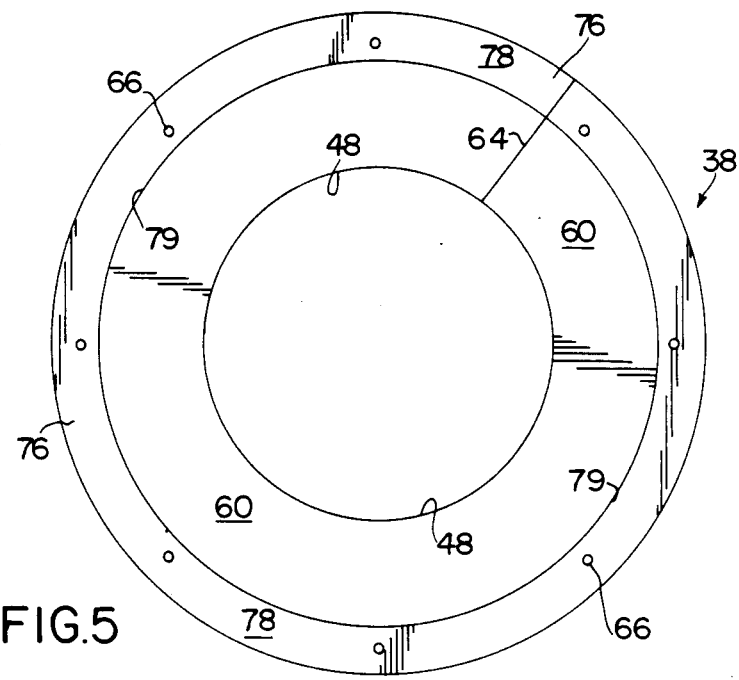
FIG. 5 is a side view showing the right surface of the seal ring of the present invention.

As shown in FIGS. 1, 4 and 5, the seal assembly 10 includes an annular seal ring 38 which surrounds and is spaced from the spacer 20. A portion 40 of seal ring 38 extends outwardly to engage or contact the inner surface 26 of outer shaft 12. As shown in FIGS. 1 and 4, portion 40 is defined by an annular recess 42 which is cut in the radially outer or top surface 44 of the seal ring 38, so that only portion 40 of the ring 38 engages the inner surface 26 of the shaft 12, thereby minimizing radial pressure loading and associated friction and wear between the seal ring 38 and shaft 12. Surface 44 of seal ring 38 is spaced from outer shaft 12 to form annular clearance or space 46 for pressure relief. Preferably, portion 40 intimately contacts surface 26 to prevent leakage of fluid from space 46 directly to the low pressure reservoir $P_L$. Radially inner or bottom surface 48 is spaced from spacer 20 on inner shaft 14 to form an annular space or clearance 50.

The seal ring 38 is not fixedly attached to the outer shaft 12 but instead presses radially outward against the outer shaft surface 26, particularly during rotation, because of the combined centrifugal force of relatively high magnitude acting on the mass of seal ring 38 and the hydrostatic force of fluid occupying space 50 and exerting pressure upon bottom surface 48 of the seal ring 38. The presence of pressurized fluid from high pressure reservoir $P_H$ in space 46 provides a radially inward force which partially counteracts the pressure load on surface 48 and the centrifugal outward forces on the seal ring 38. However, because of the net outward radial force, which may be relatively slight as long as it acts outwardly, the seal ring 38 has a tendency to rotate with and assume the rotational speed of the outer shaft 12. Axial movement of shaft 12 will tend to produce virtually identical movement of seal ring 38, unless such movement of the seal ring is opposed by other forces sufficient to overcome the above-described combination of centrifugal and hydrostatic forces acting outward on the seal ring.

In this regard, because of the need to minimize or prevent rubbing contact within seal 10, any relative axial motion between the shafts 12 and 14 must be accompanied by shifting of the relative positions of shaft 12 and seal ring 38, in order to prevent contact between seal ring 38 and either of runners 16 and 18. Accordingly, as detailed further below, the present invention includes a hydrostatic and hydrodynamic system to axially shift or slide the seal ring axially in response to relative axial movement between shafts 12 and 14.

The seal ring 38 is positioned between runners 16 and 18 and is slightly less wide than spacer 20, so that a gap or clearance normally exists on each side (left and right, FIG. 1) of the ring. Specifically, inner surface 52 of first runner 16 is spaced from the left (or upstream) side or surface 54 of the seal ring 38, to form gap 56. Inner surface 58 of second runner 18 spaced from the right (or downstream) side or surface 60 of seal ring 38, to form gap 62. It is important that during operation of seal assembly 10, seal ring 38 is surrounded by the fluid occupying spaces 46 and 50 (above and below) and gaps 56 and 62 (left and right) of seal ring 38, as shown in FIG. 1.

It is typical in inter-shaft seals to provide the seal ring, such as seal ring 38, with a simple crack or split 64, as shown in FIGS. 4 and 5, to permit radial flexure. The crack or split 64 typically results in tolerable leakage across the seal assembly 10, but permits seal ring 38 to expand radially while rotating with outer shaft 12, causing the extended portion 40 of seal ring 38 to seat tightly against surface 26. A thin machine-cut joint may be provided as an alternative to a simple crack or split.

As shown in FIGS. 3 and 4, the seal ring 38 also includes a plurality of circumferential, spaced axial passages or ports 66 which extend axially through the width of the ring. The seal ring 38 also includes an annular recess 68 having a surface 70 extending radially between edges 72 and 74 formed in the left side 54 of the seal ring. The upstream ends of passages 66 penetrate surface 70 to place passages 66 in communication with fluid occupying gap 56 in the vicinity of recess 68. The seal ring 38 also includes a second annular recess 76 formed on the downstream surface 60 of the seal ring and having a surface 78 which extends from an edge 79 to the top of the seal ring portion 40 proximate the surface 26 of outer shaft 12. At the right side of the seal ring 38, the passages 66 are spaced radially beyond the edge 79, so that the downstream ends of the passages are in direct fluid communication with the low pressure reservoir $P_L$. As explained more thoroughly below, recesses 68 and 76 provide an area of evenly distributed low pressure which hydrostatically balances the seal ring 38 between the runners 16 and 18. As a result, fluid occupying the vicinity of the annular recesses 68 and 76 will tend to assume a common, uniform pressure.

The pressure differential across the seal creates a tendency for fluid flow from the high pressure reservoir $P_H$ through the seal assembly and into the low pressure reservoir $P_L$, i.e., from left to right as indicated by the arrows in FIG. 1. The numbers and dimensions of passages 32 and 66 need only be sufficient to provide for uniform free flow of fluid, typically a gas, across the seal assembly 10.

Fluid flows axially from the high pressure reservoir $P_H$ through annular space 30 and the passages 32 toward low pressure reservoir $P_L$. When the seal ring 38 is centrally located in its preferred position between runners 16 and 18, high pressure fluid flows generally along two main flow patterns. In the first pattern, high pressure fluid flows through annular space 30, down gap 56 between the inner surface 52 of runner 16 and the left side 54 of ring 38, into recess 68 and through the passages 66 into the low pressure reservoir $P_L$.

In the second pattern, a portion of the high pressure fluid exiting the passages 32 flows past the bottom surface 48 of seal ring 38 via space 50, up into gap 62, past the surface 36 of runner 18 and into the low pressure reservoir $P_L$. The remaining portion of fluid flows up into gap 56 and into the annular recess 68, and then through the passages 40 into the low pressure reservoir $P_L$.

The solid lines of FIGS. 6 and 7 illustrate the hydrostatic pressures of fluid which occupies gaps 56, 62 to produce forces on the left and right sides, respectively, of the seal ring 38. The hydrostatic pressures of fluid in gap 56 are shown in FIG. 6, and the hydrostatic pressures of fluid in gap 62 are shown in FIG. 7. On either side of seal ring 38, the pressure distributions vary between maximum values equal to $P_H$, the pressure in reservoir $P_H$, and minimum values equal to $P_L$, the pressure in reservoir $P_L$. The elements of the seal assembly 10 are designed so that the pressure forces acting on the left surface 54 and right surface 60 of the seal ring 38 are equally opposing when the seal ring is centrally positioned between the runners 16 and 18. This is accomplished in the present invention through the use of flow passages 32 and 36 in combination with annular recesses 68 and 76 formed in the sides of the seal ring for "tuning" the hydrostatic pressure distributions (FIGS. 6, 7). These recessed surfaces are employed to provide for regions of uniform pressure as a result of flow expansion and reduced flow resistance.

As shown in FIG. 1, surface 70 of recess 68 and surface 78 of recess 76 are distanced axially from the inner surfaces 52 and 58 of runners 16 and 18 respectively, by amounts which exceed the dimensions of gaps 56 and 62 which surround the seal ring 38. Accordingly, and as shown in FIGS. 6 and 7 (solid lines) (portions C–D and G–H, respectively), the hydrostatic pressures proximate the recesses 68 and 76 on either side of seal ring 38 are uniformly equal to the pressure in low pressure reservoir $P_L$. Because the spacings of gaps 56 and 58 are typically in the range of 0.0001 and 0.0005 inches, and, because the flow patterns are confined to the gaps, the axial depths of recesses 68 and 76 which provide for pressure equalization must be substantially greater than the spacings of gaps 56 and 58. Because of compressibility characteristics of gas, and to eliminate pneumatic hammer and like problems, these depths should preferably range between 0.005 and up to 0.020 inches.

It is critical to the present invention to produce a seal assembly which is hydrostatically "balanced" both axially and radially. As best shown in FIGS. 1, 6 and 7 (solid lines), the present seal is hydrostatically balanced axially in the sense that essentially equal but opposing forces are simultaneously exerted on left surface 54 and right surface 60 of seal ring 38. The seal ring 38 is thus substantially centered axially between runners 16 and 18.

It will be recognized that the radial locations of edges 72 and 74 of left recess 68 and the radial location of edge 79 of right recess 76 may be chosen to define the appropriate size of the areas of seal ring 38 upon which pressure $P_L$ acts and to thus determine the remaining areas of seal ring 38 upon which the remaining forces will be exerted corresponding to the respective hydrostatic pressure distributions in gaps 56 and 62, as shown in (FIGS. 6 and 7). The recesses can be sized, either through calculation or testing, or both, so that the hydrostatic forces on each side of the seal ring 38 are equal.

Further, the hydrostatic forces on the seal ring 38 also serve to properly position the seal ring radially between the outer shaft 12 and inner shaft 14. The high pressure fluid $P_H$ occupying clearance 50 acts on the bottom surface 48 of the seal ring 38 and tends to force the portion 40 of the ring into contact with the inner surface 26 of the shaft 12. As previously noted, this hydrostatic force is in addition to, but relatively small in magnitude in comparison to, the centrifugal forces on seal ring 38 when it is rotating at high speeds with shaft 12. The annular recess 42 formed in the radially outer or top surface 44 of the seal ring 38 is directly aligned with the annular space 30 formed between the shaft 12 and the runner 16. As a result, the high pressure fluid flowing through space 30 will occupy annular space 46 and will tend to create a downward or radially inward force which opposes most, but not all, of the upward force imposed by fluid from reservoir $P_H$ acting upon the bottom surface 48 of the seal ring 38.

This radially balanced design properly presses the seal ring 38 into contact with the shaft 12 while still minimizing the friction force between the extended portion 40 and interior surface 26, so that when necessary the seal ring can be made to shift or slide axially along the outer shaft to avoid rubbing contact with the runners 16, 18 as a result of axial play between shafts 12, 14.

In accordance with the invention, the present invention includes a hydrostatic means, including seal ring flow passage means for admitting the fluid to flow axially through the seal ring, for utilizing the pressure differential between the high pressure reservoir and the low pressure reservoir to create hydrostatic forces that tend to maintain the sides of the seal ring substantially uniformly spaced from the respective radially extending side surfaces of the runners. As embodied herein, the hydrostatic means includes (i) the plurality of axial passages 32 formed in first runner 16, (ii) the annular clearance 30, (iii) the plurality of passages 66, (iv) the recesses 68 and 76, (v) the gaps 56, 62 and (vi) the space 50 which permits fluid to surround the sides and bottom of the seal ring.

As noted previously, concentrically rotating shafts of the type for which the present invention is designed often are subject to relative axial movement. The present invention includes a hydrodynamic system to make corrections for any such movement, thereby increasing the seal s durability, efficiency and useful life.

In accordance with the invention, the present invention includes a hydrodynamic means, including means formed in the radially extending surfaces of the runners, for generating a hydrodynamic lifting force proportionate to the relative rotation between the inner and outer shafts to axially slide the seal ring relative to the outer shaft in response to relative axial movement between the inner and outer shafts and thereby prevent the seal ring from contacting the runners.

As embodied herein, and as illustrated in FIGS. 1, 2 and 3, the hydrodynamic means for axially sliding the seal ring relative to the outer shaft includes a plurality of spiral grooves 80 and 82 formed on the inner surfaces 52 and 58 of the runners 16 and 18 and the seal ring 38 proximate the grooves and disposed radially inward of edges 74 and 79. As shown, the grooves are separated by lands 84 and 86. The configuration of the spiral grooves and their effect on seal performance will be explained more fully below.

The spiral grooves 80 and 82 are positioned opposite the radially inward or bottom portions of the sides 54 and 60 of the seal ring 38 and extend radially outward a predetermined distance towards recesses 68 and 76. Annular notches 83 and 83' are preferably provided in runners 18 and 16, respectively, to serve as inlets of the spiral grooves 80 and 82.

In operation of seal assembly 10, at times when relative axial movement occurs between shafts 12 and 14, the hydrodynamic lift force generated by respective grooves 80 or 82 in the reducing gap 56 or 62 increases substantially exponentially with reduction in the gap spacing. In other words, as axial play between shafts 12 and 14 causes movement of the seal ring 38 and changes the width of gaps 56 and 62 from their nominally equal values, the hydrodynamic lift force acting on the surface 54 or 60 of the seal ring adjacent the narrower gap will increase. The increased hydrodynamic force in the narrower gap will ultimately overcome the friction force between the seal ring 38 and the shaft 12 and force the seal ring to slide axially along the shaft 12 and return to a substantially centered (or force-neutral) position between runners 16 and 18. Thus, axial force equilibrium is restored with respect to seal ring 38.

As shown by the dashed lines in FIG. 6 and 7 (portions D–F and H–J, respectively) the pumping action of the spiral grooves 80 and 82 results in a pressure increase in gaps 56 and 62 respectively. The pressure rises from a value $P_H$ equal to the pressure of the high pressure fluid at the radially inward side of seal assembly 10, to a maximum value at substantially the outer radius of the spiral grooves 80 and 82 configuration (positions E and I, respectively), and decreases to a value corresponding to the pressure of the low pressure fluid $P_L$ at the effective or hydraulic radii of runners 16 and 18, which correspond to the radially inward edge 74 of recess 68 and edge 79 of recess 76 (positions D and H, respectively).

As noted, the recesses 68, 76 are thus effective to define a region of pressure $P_L$ on either side of seal ring 38 to assist the hydrostatic balancing of seal ring 10. The recesses are further effective to define or to limit radially the extent of the hydrodynamic pressure increase in gaps 56, 62 which is caused by the pumping action of spiral grooves 80, 82.

The spiral grooves are disposed radially between the passages formed in the first runner and the passages formed in the seal ring and are dimensioned and configured to effect the pumping of fluid in the radially outward direction. As embodied herein, and as shown in FIGS. 2 and 3, spiral grooves 80, 82 are positioned radially between passages 32 and 66. Analytical methods useful for optimizing the spiral groove geometry to produce maximum lift forces for a given seal operating envelope are described in the NASA paper by DiRusso, noted previously, which is hereby incorporated by reference. Ultimately, the appropriate size and shape of the grooves and proximate surfaces of the runner and seal ring can be determined through analytic calculations and actual testing.

In general, the pressure obtained from the pumping action of spiral grooves 80, 82 can be increased by the machining of larger spiral groove angles, with corresponding smaller ratios of the width of grooves 80, 82 to the respective lands 84, 86. Alternatively, smaller spiral groove angles with larger ratios of land width to groove width will minimize leakage, but will reduce pressure generation.

For the purpose of explanation only, a specific example of a seal assembly according to the present invention will be described. The example stated below will disclose one preferred embodiment of the present invention and will allow a better understanding of the comparative sizes and shapes of the elements of the invention. This example, however, is not meant to limit the full scope of the present invention, which is appropriately defined by the claims. When the invention is applied to a seal for multishafted aircraft turbine engines, it is desired to provide a seal between a high pressure reservoir $P_H$ containing air at a pressure of 60 psia and a low pressure reservoir containing oil mist at a pressure of 15 psia, wherein the outer shaft 12 has a nominal I.D. of 8.5 inches and the inner shaft 14 has a nominal O.D. of 7.5 inches and the shafts are rotating at speeds between 10,000 and 30,000 rpm. Applicant has designed such a seal that has the following dimensions:

| | |
|---|---|
| radial width of first runner 16: | 0.45 inches |
| radial width of second runner 18: | 0.45 inches |
| radial width of seal ring 38: | 0.30 inches |
| axial width of seal ring 38: | 0.25 inches |
| outer surface 28 of first runner 16 to interior surface 26 of shaft 12: | 0.05 inches |
| outer surface 36 of second runner 18 to interior surface 26 of shaft 12: | 0.05 inches |
| outer surface 44 of seal ring 38 to interior surface 26 of shaft 12: | 0.02 inches |
| axial width of extended portion 40 of seal ring 38: | 0.05 inches |
| inner surface 48 of seal ring 38 to annular spacer 20: | 0.050 inches |
| width of gap 56 between seal ring 38 and first runner 16: | 0.00025 inches |
| width of gap 62 between seal ring 38 and first runner 18: | 0.00025 inches |
| depth (axial) of recess 68 in left side of seal ring 38: | 0.015 inches |
| radial width of recess 68: | 0.050 inches |
| inner edge 74 of recess 68 to centerline of shaft 14: | 4.145 inches |
| depth (axial) of recess 76 in right side of seal ring 38: | 0.015 inches |
| inner edge 79 of recess 76 to centerline of shaft 14: | 4.200 inches |
| I.D. of passage 32 in first runner 16: | 0.050 inches |
| centerline of passage 32 to centerline of shaft 14: | 3.940 inches |
| I.D. of passages 66 in seal ring 38: | 0.030 inches |
| axial length of passages 66 in seal ring 38: | 0.235 inches |
| centerline of passages 66 to centerline of shaft 14 (average): | 4.250 inches |
| inner/outer radii of spiral grooves 80 in first runner 16: | 3.980/4.160 inches |
| inner/outer radii of spiral grooves 82 in first runner 18: | 3.980/4.160 inches |
| depth of spiral grooves 80, 82: | 0.0003 inches |
| width of spiral grooves 80, 82: | 0.150 inches |
| width of lands 84, 86: | 1.100 inches |
| angle of spiral grooves 80, 82 | 50 degrees |

Contrary to current practice where inter-shaft seal rings are commonly made of relatively soft carbon graphite, seal ring 38 is manufactured of composite fibrous materials (or any other light, stiff material) to control stiffness of seal ring 38 in various directions and to resist radial and angular distortion which could produce "coning" of the seal ring. Such construction promotes substantial parallelism of surfaces 52, 54 and 58, 60. Sufficient cross-sectional stiffness of seal ring 38 is especially important at times when relative axial movement between shafts 12 and 14 results in seal ring 38 being urged closer to either first runner 16 or second runner 18. The large hydrodynamic axial counterforces generated by spiral grooves 80 and 82 to restore seal ring 38 to its normal position centered between runners 16 and 18, must not twist seal ring 38 with loss of substantial parallelism between the seal ring 38 and runners 16 and 18. By selection of materials for seal ring 38 having a high modulus of elasticity, undesirable radial and angular deflections of the seal ring 38 may be minimized.

In summary, as a result of the complete hydrostatic pressure balance around seal ring 38, spurious rubbing contact is prevented in seal assembly 10 at times when shafts 12 and 14 are relatively rotating and when outer shaft 12 is stationary. In addition, at times when there is relative axial movement between shafts 12 and 14, spiral grooves 80 and 82 produce strong hydrodynamic forces tending to maintain seal ring 38 centrally between first runner 16 and second runner 18, thereby preventing rubbing contact.

Alternatively, other geometrical configurations such as rectangular-shaped grooves (not shown) may be used in lieu of the spiral grooves of the present preferred embodiment for generating the hydrodynamic lift force. An advantage to the use of rectangular-shaped grooves is that the hydrodynamic lift force is produced irrespective of the relative directions of rotation of the shafts 12 and 14.

It will be apparent to those skilled in the art that various modifications, variations and additions can be made in the present invention without departing from the spirit or scope of the present invention. Thus, it is intended that the present invention cover the modifications and variations they come within the general scope of the claims and their equivalents.

What is claimed is:

1. A seal assembly positioned between a rotatable hollow outer shaft and a rotatable inner shaft within the outer shaft, for sealing a high pressure fluid reservoir from a low pressure fluid reservoir, comprising:

axially spaced radially extending first and second runners attached to the inner shaft and radially spaced from the outer shaft, the runners having opposed, radially extending side surfaces, the first runner disposed adjacent to the high pressure fluid reservoir;

an annular seal ring surrounding and radially spaced from the inner shaft, a portion of the seal ring extending radially to slidably contact the outer shaft, the seal ring being disposed between the runners and having side surfaces that are spaced from the opposed side surfaces of the runners;

an annular spacer attached to the inner shaft and extending axially between the runners a predetermined distance greater than the axial width of the seal ring and being radially spaced from the seal ring;

hydrostatic means, including seal ring flow passage means including a plurality of flow passages extending axially through the seal ring for admitting the fluid to flow axially through the seal ring, for utilizing the pressure differential between the high pressure fluid reservoir and the low pressure fluid reservoir to create hydrostatic forces on the seal ring that tend to maintain the side surfaces of the seal ring substantially uniformly spaced from the respective radially extending side surfaces of the runners, said hydrostatic means further including a plurality of flow passages extending axially through the first runner and located radially proximate the space between the seal ring and the spacer, whereby the radially-inward axially-extending surface of the seal ring is subjected to fluid at the high pressure, wherein the seal ring flow passage means further includes a first annular recess formed in the side surface of the seal ring adjacent the first runner and a second annular recess formed in the opposite side of the seal ring, the plurality of the flow passages in the seal ring extending between and being in fluid communication with the first and second recesses, the recesses being dimensioned and configured to create substantially uniform pressure adjacent to the recesses; and hydrodynamic means, including means formed in the opposed radially extending side surfaces of the runners, for generating a hydrodynamic lifting force proportionate to relative rotation between the inner and outer shafts to axially slide the seal ring relative to the outer shaft in response to relative axial movement between the inner and outer shafts and thereby prevent the seal ring from contacting the runners.

2. The seal assembly of claim 1, wherein the means formed in the side surfaces of the runners for generating a hydrodynamic lifting force include a plurality of radially extending grooves.

3. The seal assembly of claim 2, wherein the grooves are disposed radially inward of the first annular recess formed in the seal ring.

4. The seal assembly of claim 2, wherein the grooves are disposed radially outward of the flow passages in the first runner and radially inward of the flow passages in the seal ring.

5. The seal assembly of claim 2 wherein the grooves are spiral or rectangular in shape.

6. The seal assembly of claim 1, wherein the second annular recess extends to the radially outer surface of the seal ring.

7. The seal assembly of claim 1, further comprising an annular notch provided in at least one runner proximate the radially-inward axially-extending surface of the seal ring.

8. The seal assembly of claim 1, wherein the first and second recesses have an axial depth of substantially from 0.005 to 0.020 inches.

9. The seal assembly of claim 8, wherein the first annular recess extends radially a distance of substantially from 0.02 to 0.20 inches and the second annular recess extends radially a distance of substantially from 0.02 to 0.20 inches.

10. The seal assembly of claim 1, wherein the first runner is spaced from the outer shaft a distance of substantially from 0.01 to 0.10 inches and the second runner is spaced from the shaft a distance of substantially from 0.01 to, 0.10 inches.

11. The seal assembly of claim 7, wherein the passages in the first runner and the seal ring are substantially cylindrical having an I.D. in the range between, 0.02 and 0.08 inches.

12. A seal assembly positioned between a cylindrical housing and a central shaft concentrically mounted for rotation within the housing, for sealing a high pressure fluid reservoir from a low pressure fluid reservoir, comprising:

a first runner fixed to the central shaft and extending radially outward toward the inner surface of the cylindrical housing but being spaced a first predetermined distance from the housing, said first runner disposed adjacent to the high pressure fluid reservoir;

a second runner fixed to the central shaft and extending radially outward toward the inner surface of the cylindrical housing but being spaced a second predetermined distance from the housing;

said first and second runners being axially spaced from each other by a third predetermined distance and having opposed radially extending surfaces;

an annular seal ring positioned between the first and second runners and around and radially spaced from the central shaft, at least a portion of said seal ring extending radially outward to engage the inner surface of the cylindrical housing for sliding contact, the seal ring having side surfaces that are spaced from the opposed side surfaces of the runners, the seal ring having an axial width that is less than the third predetermined distance between the runners to permit a fluid flow to occupy the spaces between the seal ring and the respective runners; and hydrostatic means, including seal ring flow passage means including a plurality of flow passages extending axially through the seal ring and located radially beyond the second runner for admitting the fluid to flow axially through the seal ring, for utilizing the pressure differential between the high pressure reservoir and the low pressure reservoir to create hydrostatic forces on the seal ring to press the seal ring against the outer shaft and to maintain the side surfaces of the seal ring substantially uniformly spaced from the respective radially extending side surfaces of the runners, the hydrostatic means including a flow path defined by the spaces between the seal ring, the runners and the central shaft, and a plurality of flow passages extending axially through the first runner and located radially proximate the space between the seal ring and the central shaft, whereby the radially-inward axially-extending surface of the seal ring is subjected to fluid at the high pressure, wherein the seal ring flow passage means further includes a first annular recess having a predetermined axial depth and formed in the side of the seal ring adjacent the first runner, and a second annular recess having a predetermined axial depth and formed in the opposite side of the seal ring, the plurality of the flow passages in the seal ring extending between and being in fluid communication with the first and second annular recesses, the first and second annular recesses being dimensioned and configured to create substantially uniform pressure adjacent the recesses.

13. The seal assembly of claim 12, wherein said hydrostatic means includes an annular recess formed in the top surface of the seal ring and in fluid communication with the high pressure fluid reservoir.

14. The seal assembly of claim 12, wherein the shape of the grooves is selected from the group consisting of spiral shaped grooves and rectangular shaped grooves.

15. A seal assembly positioned between a rotatable hollow outer shaft and a rotatable inner shaft within the outer shaft, for sealing a high pressure fluid reservoir from a low pressure fluid reservoir, comprising:

axially spaced radially extending first and second runners attached to the inner shaft and radially spaced from the outer shaft, the runners having opposed, radially extending side surfaces;

an annular seal ring surrounding and radially spaced from the inner shaft, a portion of the seal ring extending radially to slidably contact the outer shaft, the seal ring being disposed between the runners and having side surfaces that are spaced from the opposed side surfaces of the runners;

hydrostatic means, including a plurality of flow passages extending axially through the seal ring for admitting the fluid to flow axially through the seal ring, for utilizing the pressure differential between the high pressure fluid reservoir and the low pressure fluid reservoir to create hydrostatic forces on the seal ring that tend to maintain the side surfaces of the seal ring substantially uniformly spaced from the respective radially extending side surfaces of the runners;

a first annular recess formed in the side surface of the seal ring adjacent the first runner and a second annular recess formed in the opposite side of the seal ring, the plurality of the flow passages in the seal ring extending between and being in fluid communication with the first and second recesses, the recesses being dimensioned and configured to create substantially uniform pressure adjacent to the recesses; and hydrodynamic means, including means formed in the opposed radially extending side surfaces of the runners, for generating a hydrodynamic lifting force proportionate to relative rotation between the inner and outer shafts to axially slide the seal ring relative to the outer shaft in response to relative axial movement between the inner and outer shafts and thereby prevent the seal ring from contacting the runners.

16. The seal assembly of claim 15, further comprising an annular recess formed in a predetermined portion of the top surface of the seal ring and in fluid communication with the high pressure fluid reservoir, thereby minimizing the top surface area of the seal ring that contacts the outer shaft and offsetting some, but not all, of the hydrostatic force pressing the seal ring into contact with the outer shaft.

17. The seal assembly of claim 15, wherein the seal ring is radially expandable.

* * * * *

UNITED STATES PATENT AND TRADEMARK OFFICE
CERTIFICATE OF CORRECTION

PATENT NO. : 4,972,986

DATED : November 27, 1990

INVENTOR(S) : Abraham Lipschitz

It is certified that error appears in the above-identified patent and that said Letters Patent is hereby corrected as shown below:

IN THE CLAIMS:

Claim 10, column 11, line 59, delete [,] after --to--.

Claim 11, column 11, line 60, change "claim 7" to --claim 1--.

Claim 11, column 11, line 62, delete [,] after "between".

Signed and Sealed this

Tenth Day of March, 1992

Attest:

HARRY F. MANBECK, JR.

Attesting Officer

Commissioner of Patents and Trademarks